United States Patent [19]

Gründ

[11] Patent Number: 4,605,031
[45] Date of Patent: Aug. 12, 1986

[54] METHOD OF AND DEVICE FOR REPAIRING SLIDE-VALVE SPINDLES

[76] Inventor: Klaus J. Gründ, Winkelweg 5, 8071 Unterhaunstadt, Fed. Rep. of Germany

[21] Appl. No.: 618,196

[22] Filed: Jun. 7, 1984

[30] Foreign Application Priority Data

Jun. 7, 1983 [DE] Fed. Rep. of Germany ....... 3320505

[51] Int. Cl.⁴ ............................................. F16K 43/00
[52] U.S. Cl. .................................. 137/15; 29/157.1 A; 29/402.08; 29/402.12; 137/315
[58] Field of Search .......... 29/213 R, 213 E, 157.1 A, 29/402.08, 402.12; 137/15, 315, 318, 329; 251/248, 249, 249.5, 250.5, 266

[56] References Cited

U.S. PATENT DOCUMENTS

| | | | |
|---|---|---|---|
| 2,373,020 | 4/1945 | Doster | 137/315 |
| 2,626,775 | 1/1953 | Lange et al. | 137/315 |
| 2,746,470 | 5/1956 | Laird | 137/15 |
| 3,583,416 | 6/1971 | Nebesnik | 137/315 |
| 3,644,982 | 2/1972 | Anderson | 137/315 |
| 3,648,718 | 3/1972 | Curran | 137/315 |
| 4,531,272 | 7/1985 | Cohen | 29/402.08 |

FOREIGN PATENT DOCUMENTS 1215752 4/1960 France ................... 137/315

Primary Examiner—G. L. Walton
Attorney, Agent, or Firm—Karl F. Ross; Herbert Dubno

[57] ABSTRACT

Disclosed are a method of and a device for repairing a damaged upright spindle which is vertically movable, in a tubular attachment secured to a flange of a valve housing interconnecting two pipe sections, for raising and lowering a slider to block and unblock a flow through these sections. The attachment is removed and the damaged part of the spindle is cut off, preferably just above the housing flange, by a tool temporarily supported on that flange while the slider is left in the housing in one of its two limiting positions. Next, with the aid of a sleeve partly surrounding the remaining spindle stump, a replacement for the cut-off spindle part but of greater length is fitted onto the stump and is rigidly connected therewith. The attachment is then reconnected with the flange and is supplemented by an extension of a height exceeding that of the sleeve, the height of the extension substantially equaling the difference in length between the cut-off spindle part and its replacement.

14 Claims, 5 Drawing Figures

METHOD OF AND DEVICE FOR REPAIRING SLIDE-VALVE SPINDLES

FIELD OF THE INVENTION

My present invention relates to shutoff valves wherein a vertically reciprocable slider within a valve housing is connected with a spindle which rises within a tubular attachment of the housing and serves for placing the slider in one of two limiting positions for respectively blocking and unblocking a flow of fluid between two pipe sections adjoining the housing. More particularly this invention pertains to a method of and a device for repairing the spindles of such shutoff or slide valves after they have become worn or otherwise damaged.

BACKGROUND OF THE INVENTION

Valves of the type described are frequently used in underground ground oil pipelines or the like and are controlled, manually or otherwise, by mechanisms including a rotatable nut with female threads engaging male threads on an upper part of the associated spindle. While a prolonged use of the valve may excessively damage the threads of either the spindle or the nut, the latter can be easily replaced whereas the spindle can be removed from the valve housing only together with the slider. When, e.g. after ten or more years of use, such replacement of a spindle becomes necessary, conventional practice calls for the laying of a bypass line past the valve housing and the purging of the adjoining pipe sections by a flow of nitrogen under pressure before the slider can be extracted. The defective spindle can then be detached from the slider and replaced by a new one; upon reinsertion of the slider into the valve housing, the bypass line is removed and normal operation resumes.

This procedure for the replacement of valve spindles, being generally carried out in the open. is rather expensive and time-consuming. The extraction and reinsertion of the slider requires a disassembly of the housing and a renewal of a fluidtight seal surrounding the spindle stem in the vicinity of an upper housing flange supporting the tubular attachment. Furthermore, the delivery of oil or other fluid through the line must be stopped during installation and removal of the bypass.

OBJECTS OF THE INVENTION

Thus, an important object of my present invention is to provide a method of repairing defective spindles of a valve of the aforedescribed character with avoidance of the drawbacks discussed above.

A related object is to provide a simple device facilitating the repair of spindles in accordance with this new method.

SUMMARY OF THE INVENTION

In accordance with my present method, the tubular attachment normally surrounding the spindle found to be defective is removed to expose a portion of the spindle including its damaged part generally an upper part which projects above the housing flange at least in an elevated position of the slider. This upper part, which usually carries threads for engagement by a rotatable nut as noted above, is then severed from a spindle stump remaining fixed to the slider. Next, a replacement part of greater length than the severed upper part is solidified with the spindle stump for the transmission of torque as well as tensile and compressive stresses thereto. Thereafter, the tubular attachment is reconnected with the housing and is supplemented with an extension which equals at least the length difference between the original upper part and the replacement part so that the spindle and the slider can execute their full stroke without any risk of engagement of the junction between the spindle stump and the replacement part by the rotary nut or other associated driving member. For this reason the length of the replacement part should be at least equal to the stroke of displacement of the slider between its two limiting positions.

Advantageously, the slider is immobilized in one of these limiting positions during solidification of the spindle stump with the replacement part. If the spinde is damaged at its threads, as will usually be the case, it may be convenient to hold the slider in its bottom position (which in many instances gives passage to the controlled fluid) and to cut the spindle just above the housing flange so as to leave at least the top of the remaining stump threaded for engagement by an internally threaded coupling sleeve into which the replacement part can be screwed from above. When, however, the operation of that pipeline requires the valve slider to be held in its elevated position while repairs are going on or when the defect occurs at the junction of an unthreaded spindle stem with the threaded upper part, the slider and the spindle will have to be immobilized in that elevated position.

The use of a coupling sleeve (with or without threading) is advantageous in all instances in which the spindle stump and the replacement part cannot be joined together by welding, as where there is a danger of explosion of oil or gas carried by the pipeline. Such a sleeve, remaining as a permanent element of the repaired spindle, can be positively connected with the stump and the replacement part by transverse bolts or pins driven through aligned bores thereof.

A device for carrying out the method according to my invention comprises an annular base which is positionable around the spindle on the housing flange upon removal of the tubular attachment, tool means such as a band saw or circular saw displaceable along the base for severing the damaged upper part from the remaining spindle stump projecting above the flange, hoist means rising eccentrically from the base for gripping the upper part prior to a severing thereof and subsequently removing same from the spindle stump, and locator means on the hoist means engageable with that upper part prior to its removal for determining an alignment position of the replacement part which is to be lowered by the hoist means upon the spindle stump in order to be solidified therewith.

The tool means carried by the base of the device may further include a tool member facilitating the solidification referred to, e.g. a drill for penetrating a coupling sleeve to form the aligned bores designed to receive the interconnecting pins or bolts. The base advantageously has a ring rotatably mounted in a stationary track concentric with the flange and provided with stop means for immobilization with reference to that track in a selected angular position.

The hoist means of the device may comprise a mast of adjustable length which is provided at its top with a transverse arm so as to form therewith a gallows-like or inverted-L-shaped structure, a free end of that arm carrying gripper means engageable with the upper spindle part to be removed and with the replacement part to be attached. When that mast is mounted on the aforementioned rotatable ring, it enables the associated locator means to measure its distance from the outgoing and incoming spindle parts at all sides.

BRIEF DESCRIPTION OF THE DRAWING

The above and other features of my invention will now be described in detail with reference to the accompanying drawing in which.

SPECIFIC DESCRIPTION

Figure 1:
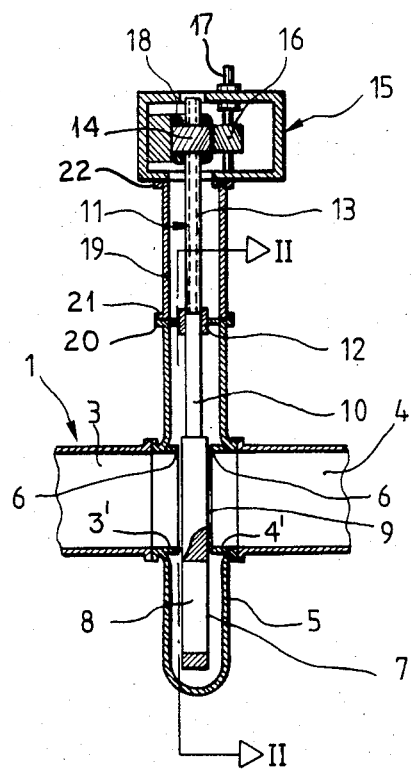
FIG. 1 is a sectional elevational view of a shutoff valve to which my invention is applicable.
Figure 2:
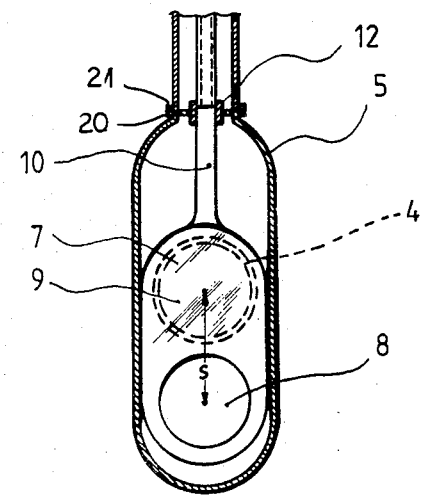
FIG. 2 is a cross-sectional view of the valve housing, taken on the line II—II of FIG. 1.

FIG. 1 shows a pipeline 1 with aligned horizontal sections 3 and 4 which are connected in a fluidtight manner with opposite sides of an oblong valve housing 5 forming internal extensions 3', 4' therefor. The space between these extensions barely exceeds the thickness of a slider 7 which is vertically reciprocable between a lower and an upper limiting position. In its lower position, also illustrated in FIG. 2, the slider blocks the passage of fluid between the two pipe sections; in its upper position, these pipe sections are aligned with an aperture 8 enabling fluid to pass through.

The vertical reciprocation of slider 7 in housing 5 is controlled by a spindle which has a stem 10 directly attached to the slider and an upper part 11 formed with screw threads 13. The unthreaded stem 10 is slidably guided in a bushing 12 which sealingly embraces it in the manner of a packing gland and is mounted on a flange 20 at the upper end of the housing. Flange 20 is engaged by a coacting flange 21 of a tubular attachment 19 which is coaxial with the spindle 10, 11 and supports a casing 15 of a driving mechanism shown only in part. This mechanism includes a nut 14 which engages the threads 13 of spindle part 11 and is rotatably but nonshiftably mounted between two fixed holding rings 18. Nut 14 has external helical teeth meshing with those of an adjoining pinion 16 mounted on a drive shaft 17 which can be rotated in one or the other direction by a nonillustrated crank or servomotor. Casing 15 is bolted onto an upper flange 22 of attachment 19 and, upon being disengaged therefrom, can be lifted off that attachment together with nut 14 and pinion 16 with unscrewing of the nut from the spindle threads 13.

Figure 3:
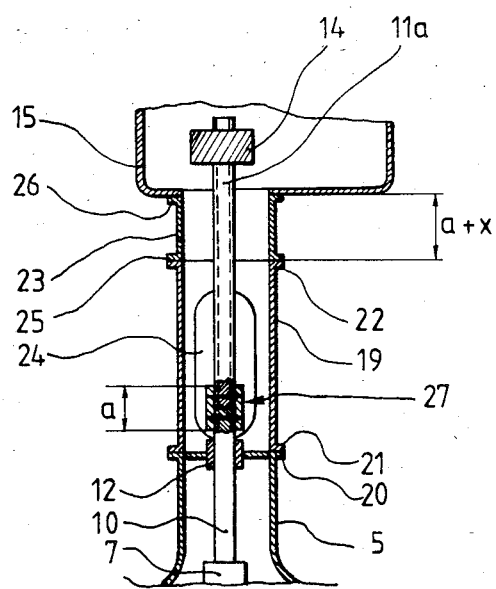
FIG. 3 is a view similar to that of FIG. 1, showing a valve spindle fitted with a replacement part in accordance with my present invention.

In FIG. 3 I have shown the old spindle part 11, whose threads are assumed to have become excessively worn, replaced by a new and similarly threaded part 11a solidified by means of a connector 27 with the spindle stem 10. This Figure also shows the casing 15 with nut 14 engaging the replacement part 11a, yet elements 16–18 of FIG. 1 have been omitted for simplicity's sake. As further illustrated in FIG. 3, casing 15 is now separated from attachment 19 by a tubular extension 23 thereof having a lower flange 25 secured to the upper flange 22 of attachment 19 and further having an upper flange 26 secured to the bottom of casing 15. Part 11a is longer than the part 11 replaced by it, the length difference exceeding the height a of connector 27 and being substantially equal to the height a+x of the extension tube 23, with the added height x preferably amounting to about 1 cm in the case of a spindle having a diameter of close to 10 cm and a thread length on the order of 1 m as is usual in shutoff valves for oil pipelines. Furthermore, the length of part 11a substantially exceeds the operating stroke s (FIG. 2) of slider 7 in order to insure that the connector 27 will not abut either the bushing 12 or the internal elements of casing 15 when that slider is lowered or raised into one or the other limiting position thereof.

Also shown in FIG. 3 is an elongate access opening 24 provided in the peripheral wall of attachment 19, whose purpose will become apparent hereinafter, of a height likewise exceeding the slider stroke s.

Figure 4:
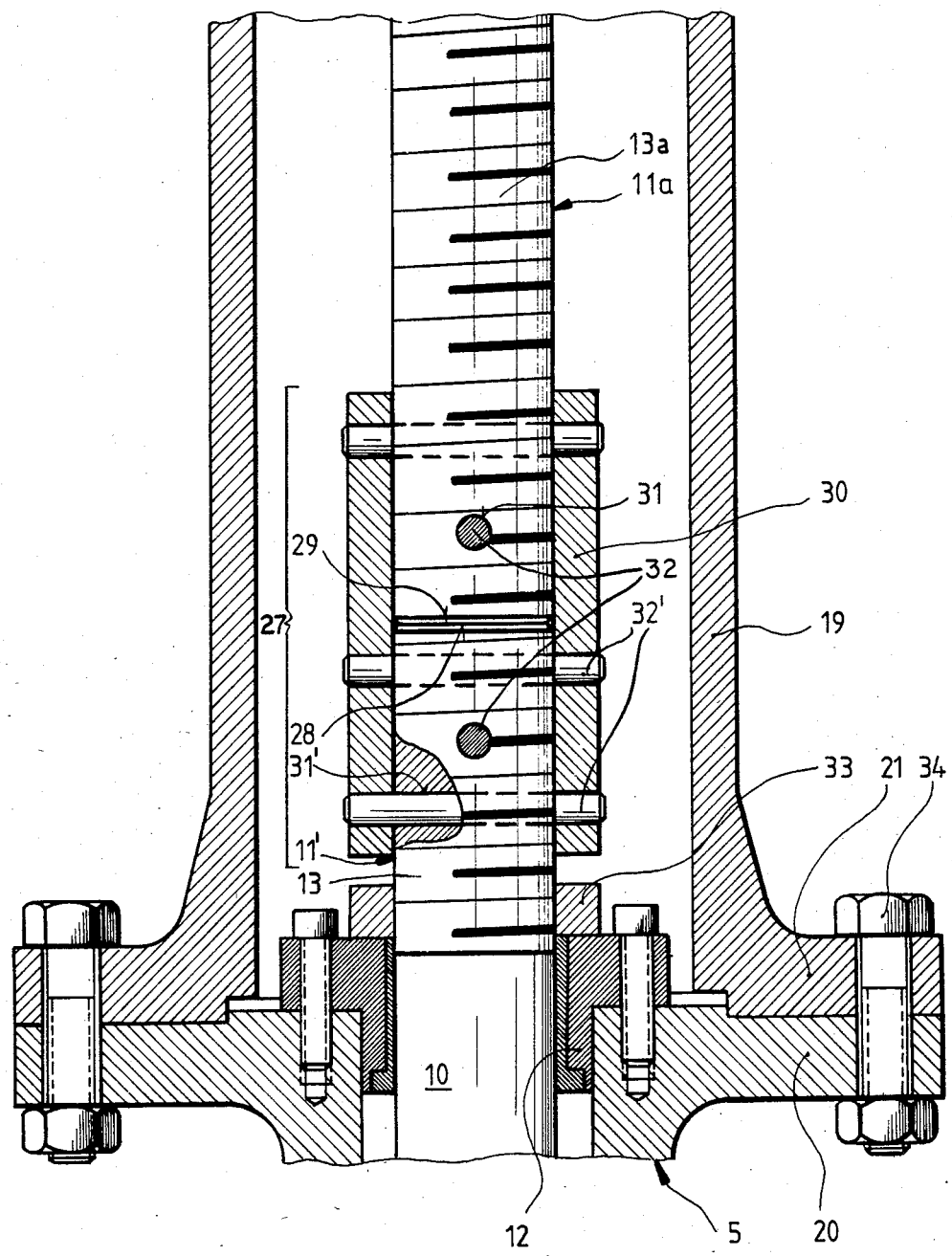
FIG. 4 is a sectional detail view, drawn to a larger scale, of part of FIG. 3 showing details of the junction between a spindle shaft and the freshly installed replacement part.

FIG. 4 shows in greater detail the connector 27 which comprises a coupling sleeve 30 bridging a spindle stump 11' and the lower end of replacement part 11a. It is assumed, in this instance, that a small portion of the threaded spindle part 11 was left in place to form the stump 11' when most of that part was cut off for replacement by part 11a. Since stump 11' and part 11a are identically threaded, they may be initially interconnected by the complementarily threaded sleeve 30. It will be noted that, in FIG. 4, the location of spindle stem 10 with reference to bushing 12 substantially corresponds to that of FIGS. 1 and 2, indicating that the slider is at its lower limiting position.

The threading of the coupling sleeve 30 onto the stump 11' and the screwing of replacement part 11a with threads 13a into the upper end of that sleeve take place, of course, while the tubular attachment 19 is separated from the housing flange 20. The threaded connection afforded by the sleeve, however, will generally not suffice for the transmission of forces from part 11a to stem 10; in particular, the stem 10 rigid with the nonrotatable slider must resist the torque exerted by the nut 14 upon the part 11a which could loosen the engagement of its threads 13a with those of the sleeve. I therefore prefer to provide additional means for positively connecting the sleeve 30 with the stump 11' and the replacement part 11a, namely two sets of relatively skew pins or bolts 32, 32' tightly fitted into bores 31, 31' in the sleeve and in the spindle parts. The confronting ends 28, 29 of stump 11' and part 11a should be well cleaned and flattened before being brought into contact with each other.

Since the joinder of parts 11' and 11a to each other must take place at a time when slider 7 is not suspended from above, it is desirable to provide it initially with a clamping ring 33 before the driving mechanism including the nut 14 is disconnected from the old spindle part 11. This clamping ring is introduced through the aperture 24 of FIG. 3 and advantageously consists of two complementarily threaded halves which are hingedly interconnected and can be fastened together at their free ends by a clip or the like to engage the threads 13 with a firm grip. Resting on the bushing 12, clamping ring 33 will prevent the slide from dropping to the bottom of valve housing 5 after the attachment 19, secured to flange 20 by bolts 34, is removed therefrom together with casing 15.

If it is necessary to perform the repair with the slider held in its upper limiting position, in which the fluid flow through valve housing 5 is unblocked, the clamping ring 33 engaging the lowermost end of thread 13 can be held elevated above bushing 12 by suitable props (e.g. semicylindrical half-sheels) of the proper length which can also be introduced through aperture 24.

Upon the reconnection of attachment 19 with housing flange 20, the engagement of the replacement part 11a by the associated spindle drive, and the extraction of clamping ring 33 along with its possible props from the interior of attachment 19 by way of aperture 24, the valve is ready for operation in the same manner as before except that casing 15 now lies at a higher level owing to the interposition of extension tube 23 (FIG. 3). This, however, is generally of no significance.

Figure 5:
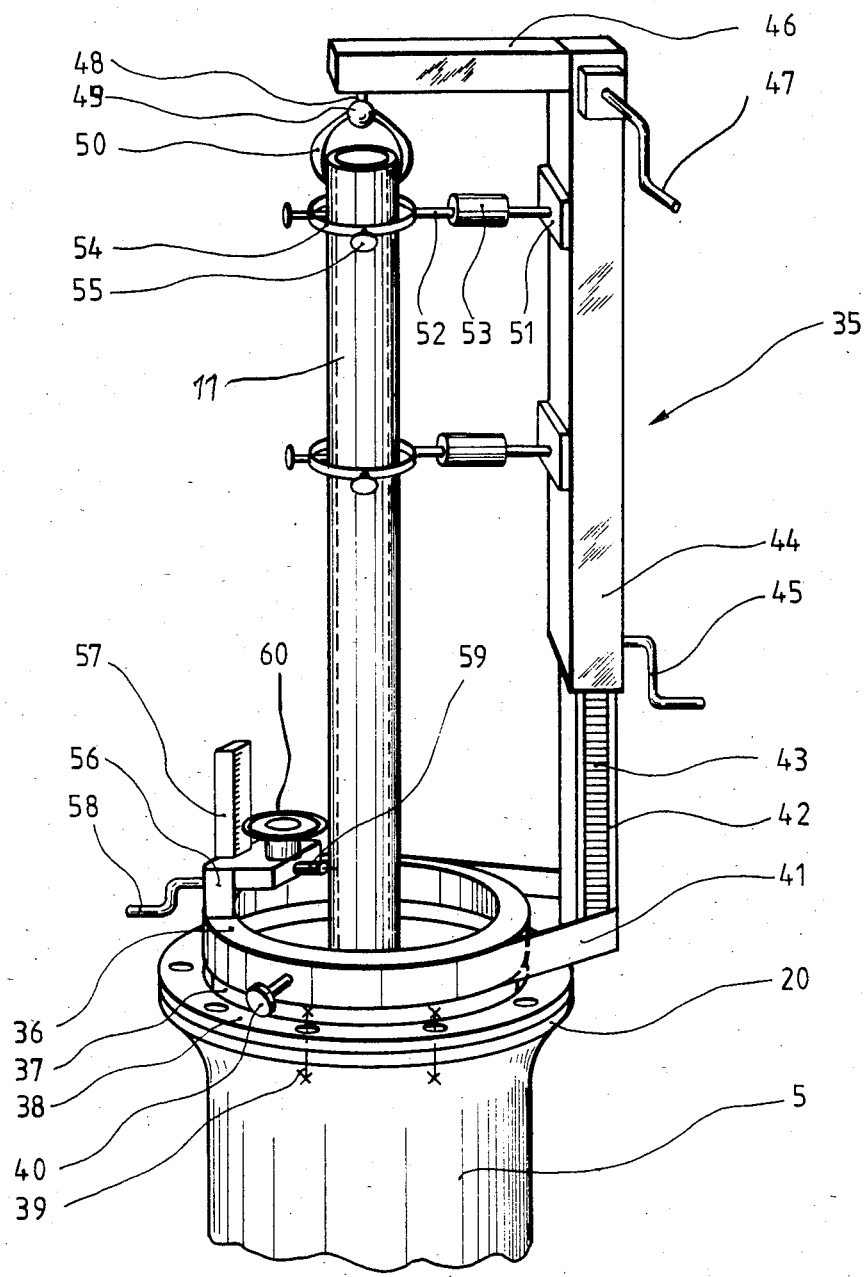
FIG. 5 is a perspective view of a device for carrying out my present method, mounted on a flange of a valve housing not further illustrated there.

Reference will now be made to FIG. 5 in which I have shown a device 35 for carrying out the spindle repair described in connection with FIGS. 3 and 4. This device comprises a base in the form of an annular flange 38 which is bolted—by screws schematically indicated at 39—to housing flange 20 and forms a track 37 for a rotatable ring 36 centered on the spindle axis. Ring 36, preferably containing bearing rollers resting on the top of track 37, can be immobilized with reference to base 38, in any desired relative angular position, by a screw 40 engaging the track 37. An outrigger 41 of ring 36 carries a telescoped mast 42 44 of rectangular profile, the inner member 42 of this mast being provided with rack teeth 43 engaged by a nonillustrated pinion within the outer member 44 which can be manually rotated by a crank 45 to extend or contract the mast. The top of member 44 carries a cantilevered transverse arm 46 whose free end, overhanging the center of ring 36, is provided with a gripper 50 comprising a pair of tongues mounted on a universal joint 49. This joint 49 is suspended by a cable 48 passing in the interior of arm 46 over rollers (not shown) to a capstan on another crank 47 enabling the gripper 50 to be raised or lowered as necessary. The inverted-L-shaped structure 42, 44, 46 and its gripper 50 thus form a hoist capable of removing the old spindle part 11, after it has been severed from the stump 11' shown in FIG. 4, and replacing it with a new part 11a as described above.

Since the replacement part 11a must be precisely aligned with the stump, I provide the device 35 with locators in the form of centering rings 54 which are connected with mast member 44 by studs 52 joined via turnbuckles 53 to supports 51. Each ring 54 has at least three peripherally spaced setting screws 55 which are brought into contact with spindle part 11 before the latter is severed from its stump. These setting screws subsequently determine the correct position of the replacement part when the latter is lowered onto the stump with the aid of crank 45 or 47. Locators of other types, e.g. interfitted V-groove rulers forming extensible measuring rods or possibly photoelectric sensors, could also be used.

The device 35 further includes an upright measuring bar 57 which rises from ring 36 and carries a tool holder 56 whose elevation can be adjusted by a crank 58. Tool holder 56 is shown provided with a circular saw 60 and a drill 59, the drill serving to make the throughgoing bores 31 and 31' shown in FIG. 4 after the spindle part 11 has been replaced by a part 11a previously secured to stump 11' by coupling sleeve 30. The rotatability of ring 36 supporting the mast 42, 44 enables the gripper 50 to turn the replacement shaft about its axis on screwing it into sleeve 30. The tools 59, 60 on holder 36 can attack the spindle and the sleeve from any side.

The use of a clamping ring 33 resting directly on the bushing 12, as in FIG. 4, has the further advantage of additionally sealing the interior of valve housing 5 against entry of dust or dirt during the repair work.

The drill 59 on tool holder 56 could be replaced by a welding head, preferably in association with a hood filled with protective gas, if circumstances allow the new spindle part 11a to be welded onto the stump 11'. In that case, of course, the coupling sleeve 30 will be omitted.

The part 11a needed in a given instance can be cut to size from a longer threaded rod so that no complete replacement spindles need be stored. If such threaded rods are held in reserve with coupling sleeves 30 integrally joined thereto, in order to be fitted onto a stump, the drilling of the uppermost bores in FIG. 4 and the insertion of connecting pins into them becomes unnecessary.

As will be apparent from the foregoing description, the repair of a valve spindle in accordance with my present invention can proceed with the associated slider in either its blocking or its unblocking position to enable normal pipeline operation during the time taken by that work.

I claim:

1. A method of repairing a spindle rising within a tubular attachment of a valve housing from a slider which is vertically reciprocable between two limiting positions within said housing for selectively blo king and unblocking a flow of fluid between two pipe sections adjoining said housing, said spindle having a damaged upper part, comprising the steps of:
   (a) removing said attachment to expose a portion of said spindle including said damaged upper part;
   (b) severing said upper part from said spindle with a spindle stump remaining fixed to said slider;
   (c) providing a replacement spindle part of greater length than said upper part and attaching said replacement part to said spindle stump;
   (d) reconnecting said attachment and said housing; and
   (e) supplementing said attachment with an extension equaling at least the length difference between said upper part and said replacement part.

2. A method as defined in claim 1 wherein the length of said upper part severed from said spindle stump is at least equal to the stroke of displacement of said slider between said limiting positions thereof.

3. A method as defined in claim 2 wherein said replacement part and said spindle stump are fitted into a coupling sleeve before being consolidated with each other in step (c), said coupling sleeve having a height not greater than said length difference.

4. A method as defined in claim 3 wherein said replacement part and at least the top of said spindle stump have threads engaged by said coupling sleeve.

5. A method as defined in claim 3 wherein said replacement part and said spindle stump are secured to each other with the aid of pins driven through said coupling sleeve.

6. A method as defined in claim 1 wherein said slider is immobilized in one of said limiting positions during step (c).

7. A device for repairing a spindle rising within a tubular attachment of a valve housing from a slider which is vertically reciprocable between two limiting positions within said housing for selectively blocking and unblocking a flow of fluid between two pipe sections adjoining said housing, said attachment being removably secured to an upwardly facing flange on said housing, said spindle having a damaged upper part projecting above said flange, said device comprising:
- an annular base positionable on said flange around said spindle upon removal of said attachment therefrom;
- tool means displaceable along said base for severing said upper part from said spindle with a remaining spindle stump projecting above said flange;
- hoist means rising eccentrically from said base for gripping said upper part prior to a severing thereof and subsequently removing the same from said spindle stump; and
- locator means on said hoist means engageable with said upper part prior to removal thereof for determining an alignment position of a replacement spindle part to be lowered by said hoist means upon said spindle stump and to be attached thereto.

8. A device as defined in claim 7 wherein said tool means includes a tool member facilitating the attaching of said replacement part to said spindle stump.

9. A device as defined in claim 8 wherein said tool member comprises a drill for penetrating a coupling sleeve placed around a junction of said replacement part with said spindle stump.

10. A device as defined in claim 7 wherein said base has a ring rotatably mounted in a stationary track concentric with said flange, said tool means being carried on said ring.

11. A device as defined in claim 10, further comprising stop means for immobilizing said ring with reference to said track in a selected angular position.

12. A device as defined in claim 7 wherein said hoist means comprises a mast of adjustable length, a transverse arm extending from the top of said mast, and gripper means on a free end of said arm engageable with said upper part and with said replacement part.

13. A device as defined in claim 12 wherein said gripper means comprises a pair of tongs universally jointed to a crank-operated lifting cable.

14. A device as defined in claim 7, further comprising support means positionable on said flange for engagement with said spindle stump to hold said slider in one of said limiting positions.

* * * * *